United States Patent
Mecl et al.

(10) Patent No.: US 12,228,458 B2
(45) Date of Patent: Feb. 18, 2025

(54) INTEGRATED FIBER OPTIC TEMPERATURE MEASUREMENT AND CONTROL SYSTEM

(71) Applicant: ACCELOVANT TECHNOLOGIES CORPORATION, North Vancouver (CA)

(72) Inventors: Ondrej Mecl, North Vancouver (CA); Noah John Joe Johnson, North Vancouver (CA); James William Wiltshire Garrow, North Vancouver (CA); Benjamin Osborne, North Vancouver (CA)

(73) Assignee: ACCELOVANT TECHNOLOGIES CORP., North Vancouver (CA)

( * ) Notice: Subject to any disclaimer, the term of this patent is extended or adjusted under 35 U.S.C. 154(b) by 0 days.

(21) Appl. No.: 18/905,860

(22) Filed: Oct. 3, 2024

(65) Prior Publication Data

US 2025/0027823 A1    Jan. 23, 2025

Related U.S. Application Data

(63) Continuation of application No. 18/817,218, filed on Aug. 28, 2024, which is a continuation-in-part of application No. 18/256,876, filed as application No. PCT/CA2022/050069 on Jan. 19, 2022.

(60) Provisional application No. 63/139,483, filed on Jan. 20, 2021.

(51) Int. Cl.
*G01K 11/3213* (2021.01)
*G01K 1/08* (2021.01)

(52) U.S. Cl.
CPC .......... *G01K 11/3213* (2013.01); *G01K 1/08* (2013.01)

(58) Field of Classification Search
CPC .................. G01K 11/3212; G01K 1/08
See application file for complete search history.

(56) References Cited

U.S. PATENT DOCUMENTS

| | | | |
|---|---|---|---|
| 5,808,730 A | 9/1998 | Danielian et al. | |
| 6,283,632 B1 * | 9/2001 | Takaki | G01K 11/18 374/161 |
| 6,881,948 B2 | 4/2005 | Dammann | |
| 7,377,689 B2 | 5/2008 | Balan | |
| 9,625,923 B2 | 4/2017 | Bohlinger et al. | |
| 10,712,757 B2 | 7/2020 | Bohlinger et al. | |
| 10,996,117 B1 | 5/2021 | Mecl et al. | |
| 2016/0149482 A1 | 5/2016 | Criminale et al. | |
| 2016/0149733 A1 | 5/2016 | Criminale et al. | |
| 2017/0323813 A1 | 11/2017 | Silveira et al. | |

(Continued)

OTHER PUBLICATIONS

International Search Report in International Application No. PCT/CA2022/050069 issued Apr. 8, 2022.

(Continued)

*Primary Examiner* — Mirellys Jagan

(57) ABSTRACT

Examples of an integrated active fiber optic temperature measuring and control system is provided. The integrated active fiber optic temperature measuring and temperature control system comprises a fiber optic probe with a fiber bundle and a sensor with an active material functionally coupled to a first end of the probe and a housing to house a temperature measuring circuitry and a temperature control circuitry. The housing is permanently integrated with the fiber optic probe.

10 Claims, 4 Drawing Sheets

(56) References Cited

U.S. PATENT DOCUMENTS

| | | |
|---|---|---|
| 2018/0053666 A1 | 2/2018 | Babayan et al. |
| 2020/0294836 A1 | 9/2020 | Criminale et al. |
| 2022/0136910 A1* | 5/2022 | Mecl .................. G01D 5/268 |
| | | 374/161 |
| 2023/0066887 A1 | 3/2023 | Ichihashi et al. |
| 2024/0019319 A1 | 1/2024 | Mecl et al. |

OTHER PUBLICATIONS

Written opinion on Patentability of International Application No. PCT/CA2022/050069 issued Apr. 8, 2022.

Grattan, K.T.V et al., A Fibreoptic Temperature Sensor Using Fluorescent Decay, SPIE vol. 492 ECOOSA '84, Amsterdam 1984 / 535.

Wickersheim, Kenneth A; Sun, Mei H., Fiberoptic Thermometry and Its Applications, Journal of Microwave Power and Electromagnetic Energy, 1987, 22:2, 85-94, DOI: 10.1080/08327823.1987.11688010.

* cited by examiner

INTEGRATED FIBER OPTIC TEMPERATURE MEASUREMENT AND CONTROL SYSTEM

CROSS REFERENCE TO RELATED APPLICATIONS

This application is a continuing application of U.S. application Ser. No. 18/817,218 filed Aug. 28, 2024, which is continuing in part application of U.S. application Ser. No. 18/256,876 filed Jun. 9, 2023, which is U.S. National Stage Application of International application No. PCT/CA2022/050069 filed Jan. 19, 2022, which claims priority from U.S. Patent Application No. 63/139,483 filed on Jan. 20, 2021. The entirety of all the above-listed applications are incorporated herein by their reference.

TECHNICAL FIELD

The present disclosure generally relates to a fiber optic temperature measuring and control system and more particularly an integrated active fiber optic temperature measuring and control system where the fiber optic probe is integrated with optoelectronic and temperature control system into a single compact assembly.

BACKGROUND

Unless otherwise indicated herein, the materials described in this section are not prior art to the claims in this application and are not admitted to be prior art by inclusion in this section.

Speed and accuracy of temperature control of electrostatic (ESC) semiconductor manufacturing process chucks are critical for process control during wafer manufacturing. The performance of the manufacturing process depends on reliable temperature measurement in the strong radio frequency (RF) environment and fast temperature control. Measurement in RF environment poses significant challenges if using traditional methods of temperature measurement such as resistance temperature detectors (RTDs) and thermocouples. This is generally overcome by utilizing fiber optic temperature sensors mounted at the bottom of the chuck and connected to external fiber optic interrogator with a temperature controller.

Temperature control systems commonly known use two separate temperature measurement channels, one for temperature control and one for overtemperature protection. Such known prior art systems comprise fiber optic sensors, fiber optic interconnects, fiber optic interrogator and temperature controller that are bulky and do not allow for embedded applications in the process chuck.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

SUMMARY

Figure 1:
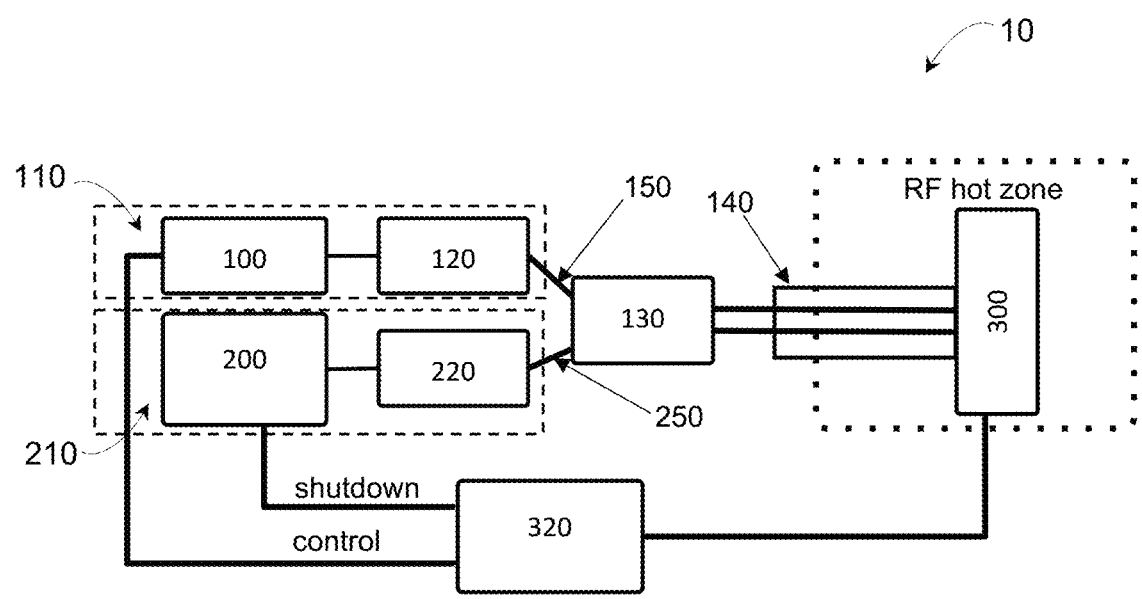
FIG. 1 is a schematic view of an example of a fiber optic temperature control system according to an embodiment of the present invention with two separate measurement channels integrated in a single probe.

In one aspect, an integrated active fiber optic temperature measuring and control system is provided. The integrated active fiber optic temperature measuring and control system comprises a fiber optic probe and a housing that houses a temperature measuring circuitry and a temperature control circuitry such that the fiber optic probe is permanently integrated with the housing. The fiber optic probe comprises a fiber bundle with a first end functionally coupled to a sensor with an active material, and a second end permanently connected to a housing that comprises a temperature measuring circuitry and a temperature control circuitry. When the active material is illuminated with an excitation light it emits light in a wavelength different from an excitation light. The temperature measuring circuitry comprises an optoelectronic circuitry that includes a light source aligned with the fiber bundle to provide the excitation light to the active material, a driver operatively coupled to the light source to trigger the light source, a detector aligned with the fiber bundle to detect the emitted light, and a processing unit operatively coupled to the driver of the light source and the detector. The processing unit determines temperature based on a change in an emission intensity at a single wavelength range or the change in intensity ratio of two or more wavelength ranges, a lifetime decay, or a shift in emission wavelength peak of the emitted light. Calibration means are coupled to the processing unit to calibrate the integrated active fiber optic temperature measurement and control system by compensating for any differences in photonic behaviors of the active material and variability in optical coupling losses in the optoelectronic circuitry to correct for the relationship of a thermal input and an electrical output of the system. The integrated fiber optic temperature measuring and temperature control system is individually calibrated to achieve higher accuracy. The temperature control circuitry comprises a temperature controller coupled to the optoelectronic circuitry to control a temperature of a heater and to trigger a control signal to shutdown a power source of the heater when a failure of a heater is detected.

In another aspect, the integrated active fiber optic temperature measuring and control system comprises a housing to house at least one temperature measuring and control system and at least one overtemperature measuring protection system integrated with a fiber optic probe into a single active integrated system. The at least one temperature measuring and control system comprises a first temperature controller and a first optoelectronic circuitry. The first optoelectronic circuitry includes a first light source aligned with the fiber bundle to provide the excitation light to an active material, a first driver operatively coupled to the light source to trigger the light source, a first detector aligned with the fiber bundle to detect the emitted light, a first processing unit operatively coupled to the first driver of the first light source and the first detector. The first optoelectronic converter converts the analog signal detected by the first detector into a digital electrical signal and feeds a temperature signal to the first temperature controller that controls temperature of a heater by sending a control signal to a heater controller. The at least one overtemperature measuring protection system comprises a second temperature controller and a second optoelectronic convertor coupled to the second controller. The second optoelectronic convertor includes a second detector and a second processing unit. The heater controller is in communication with a driver of the heater, the first temperature controller and the second temperature controller, such that the heater controller receives a control signal from the first temperature controller to stabilize a heater temperature at a predetermined range and receives a shutdown signal from the overtemperature protection system when it detects a failure of the temperature measuring and control system and/or when the heater temperature is above the predetermined range to turn off the heater.

In addition to the aspects and embodiments described above, further aspects and embodiments will become apparent by reference to the drawings and study of the following detailed description.

DETAILED DESCRIPTION OF SPECIFIC EMBODIMENTS

The present invention discloses an integrated active fiber optic temperature measuring and control device where the fiber optic probe is integrated with optoelectronic circuitry and temperature controller algorithms/circuitry into a single compact assembly to enable embedded measurement and control of temperature in RF environments. The objective of the present invention is to provide a miniature integrated fiber optic temperature sensor and temperature controller for embedded, in situ, temperature measurement and temperature control and thermal protection in RF environments.

In some implementations, the fiber optic temperature control system comprises two or more independent fiber optic temperature measuring systems combined into a single fiber optic probe. A thermographic phosphor is provided at distal ends of the probes so that at least two independent temperature measurements are provided. In some implementations the two independent fiber optic temperature measuring systems are combined into a single fiber optic probe simplifying the system while still providing two independent measurements as required by the safety standards (i.e., IEC 60730-1—Automatic electrical controls Part 1: General requirements).

Figure 2:
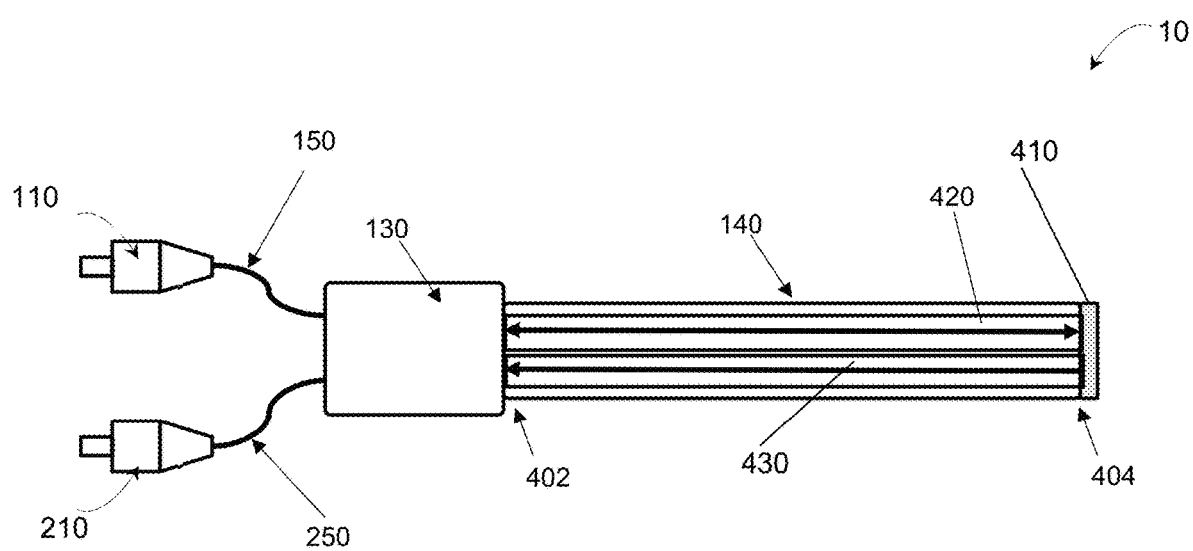
FIG. 2 is a schematic view of an example of a fiber optic temperature control system showing two separate measurement channels integrated in a single probe.

FIG. 1 illustrates an example of a fiber optic temperature control system 10 that comprises at least one temperature control measuring system 110 and at least one overtemperature measuring protection system 210. The least one temperature control measuring system 110 comprises a first temperature controller 100 and a first optoelectronic converter 120. The first optoelectronic converter 120 includes a first light source, a first detector and a first processing unit. The first light source can provide excitation light to a sensor 410 (see FIG. 2) that comprises an active sensing material. For example, the light source can be a laser or a LED that can provide an excitation light in the UV waveband range between 200-400 nm or in the blue to green wavelength range (e.g., 400-600 nm). The sensor 410 can be a thermographic phosphor. When the thermographic phosphor is illuminated with the excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak. A driver (not shown) can also be provided to trigger the first light source. The first detector is configured to receive the light emitted from the sensing active material 410. For example, the first detector can be a photodiode that can convert the optical signal (emitted light) into an analog electrical signal. The photons absorbed by the photodetector (e.g., photodiode) generate an electrical current. The electrical signal can be intensified using an amplifier and then the analog electrical signal can be digitized using an A/D converter. In alternative embodiment, the detector can comprise a plurality of LEDs to detect the emitted light. Namely, the plurality of LEDs is a semiconducting P-N junction (positive and negative doped semiconductor, such as silicon) that is capable to detect incident light by generating a photocurrent similarly as a photodiode.

The processing unit is configured to process the signals detected from the detector and determines the measured temperature. The first optoelectronic converter 120 converts the analog signal into a digital electrical signal and feeds a temperature signal to the first temperature controller 100 that controls temperature of a heater 300 by sending a control signal to a heater controller 320. The at least one temperature control measuring system 110 further comprises a first fiber optic bundle 150 with a plurality of optical fibers coupled to the first optoelectronic converter 120 to transmit the excitation and the emitted light.

The at least one overtemperature measuring protection system 210 comprises a second temperature controller 200 and a second optoelectronic convertor 220 (similar to the optoelectronic convertor 120). The second temperature controller 200 is an overtemperature protection controller that is in communication with the heater controller 320 and sends a shutdown signal to the heater controller 320 when the temperature of the heater 300 reaches a predetermined level. The second optoelectronic convertor 220 comprises a second detector and a second processing unit. The second temperature controller 200 can be passive controller and may not comprise any light source to provide excitation light to the sensing material 410. The second detector can also be a photodiode similar to the first detector. The at least one overtemperature measuring protection system 210 can further comprise a second fiber optic bundle 250 with a plurality of optical fibers to transmit the emitted light back to the second optoelectronic convertor 220. A splitter 130 is coupled to the first and the second fiber optic bundles 150, 250 to physically separate the first and the second fiber optic bundles 150, 250 into a first guiding channel 420 and a second guiding channel 430 (see FIG. 2). The first and the second guiding channels are independent optical guiding channels that are enclosed by a single probe 140. The single probe 140 have a first (proximal) end 402 coupled to the splitter 130 and a second (distal) end 404.

The sensor 410 (i.e., thermographic phosphor) is provided at the distal end 404 of the probe 140 so that at least two independent temperature measurements are provided using a single fiber optic temperature sensing probe 140 and a single sensor 410. The thermographic phosphor can be bounded together using a binding material, such as silicone or epoxy, to secure the phosphor at the second end 404 of the fiber optic probe 140. In alternative embodiment, the sensor 410, can be embedded into the heater 300 (e.g., chuck). In one implementation, the sensing active material 410 can be monolithic ceramic metal oxide phosphor composite described in a co-pending U.S. Pat. No. 10,793,772 incorporated here by reference. The phosphor can be any thermographic phosphor. The thermographic phosphor can be selected from a group of Manganese doped $Mg_4FGeO_6$:Mn and all possible stoichiometry within this class, Europium doped $La_2O_2S$:Eu, Europium doped $Y_2O_3$:Eu, Europium doped $LuPO_4$:Eu, Dysprosium doped $YVO_4$:Dy, Dysprosium doped $Y_2O_3$:Dy, Dysprosium doped $LuPO_4$:Dy, Dysprosium doped Yttrium aluminium garnet YAG:Dy and any combination thereof.

The fiber optic temperature control system 10 can be used for temperature control of the heater 300 that is controlled by the heater controller 320. The heater 300 can comprise a heating element, a power source that powers the heating element and a driver that turns on and off the heater power source. The heater control 320 is in communication with the heater's power source driver and with the at least one temperature control measuring system 110 and the at least one overtemperature measuring protection system 210.

The light source of the least one temperature control measuring system 110 is aligned with the first fiber optic bundle 150 so that the excitation light enters therein and is transmitted to the active material 410 by the first guiding channel 420. The first detector of the least one temperature control measuring system 110 is also aligned with the first fiber optic bundle 150, so that the light emitted from the active material 410 is transmitted the first guiding channel 420 and the first fiber optic bundle 150 back to the first detector. The first fiber optic bundles 150 in the guiding channel 420 can have a number of optical fibers to transmit the excitation light to the sensor 410 and the emitted light to the first detector. For example, the first fiber optic bundle 150 can comprise 300 fibers each 50 μm diameter, however the number of the fibers in the bundle 150 can be more or less than 300 without departing from the scope of the invention. The first fiber bundle 150 can transmit both the excitation and the emitted light (no separate excitation and the emitted light guides) or one portion of the fiber bundle 150 can be used as a path to deliver excitation light to the sensor 410 while a second portion of the fiber bundle 150 can be used to guide the emitted light back to the first detector. For example, a fiber bundle splitter (same or separate from the splitter 130) can be used to split the fiber bundle 150 into two separate fiber bundles fitted into the first guiding channel 420. A number of optical splitters and/or focusing lens can also be used to separate excitation light and the emitted light. The second detector of the at least one overtemperature measuring protection system 210 is aligned with the second fiber optic bundle 250 and the second guiding channel 430, so that the second detector can detect (observe) the light emitted from the sensor 410.

Persons skilled in the art would understand that the fiber optic temperature control system 10 can comprise two or more temperature control measuring system 110 and two or more overtemperature measuring protection system 210 to provide multi point measurements without departing from the scope of invention.

In one mode of operation, the light source from the at least one temperature control measuring system 110 illuminates the sensor 410 and based on the detected emitted light determines the temperature of the heater 300. When the measured temperature of the heater 300 reaches a predetermined temperature level (range), the controller 100 sends periodically ON/OFF signals to the heater controller 320 to stabilize the temperature (e.g., process temperature) typically using Proportional-Integral-Derivative (PID) control loop algorithms. The second detector also detects the emitted light from the sensor 410 and the at least one overtemperature measuring protection system 210 determines the temperature of the heater 300. If the temperature is above a certain pre-determined "trip" value, the system 210 (e.g., the second controller 200) sends the shutdown signal to the heater controller 320 to turn off the power source of the heater 300. In case of failure of the at least one temperature control measuring system 110, the at least one overtemperature measuring protection system 210 is not able to determine the temperature for shutdown purposes and therefore determines failure of the system 110 and sends a signal to the heater control 320 to turn off the heater 300 based on fault detection of system 110. For example, the second controller 200 of the at least one overtemperature measuring protection system 210 can detect a "HIGH" failure mode of the at least one temperature control measuring system 110, such as for example, when the light source of the least one temperature control measuring system 110 is permanently ON and blinding the first and second detector of both systems 110, 210, then the second controller 200 will send a signal to the heater controller 320 to turn off the heater 300. In the case when the least one temperature control measuring system 110 fails "LOW", such as when the second detector does not detect any light emitted from the sensor 410, then the second controller 200 of the at least one overtemperature measuring protection system 210 will send signal to the heater controller 320 to turn off the heater 300.

Figure 3:
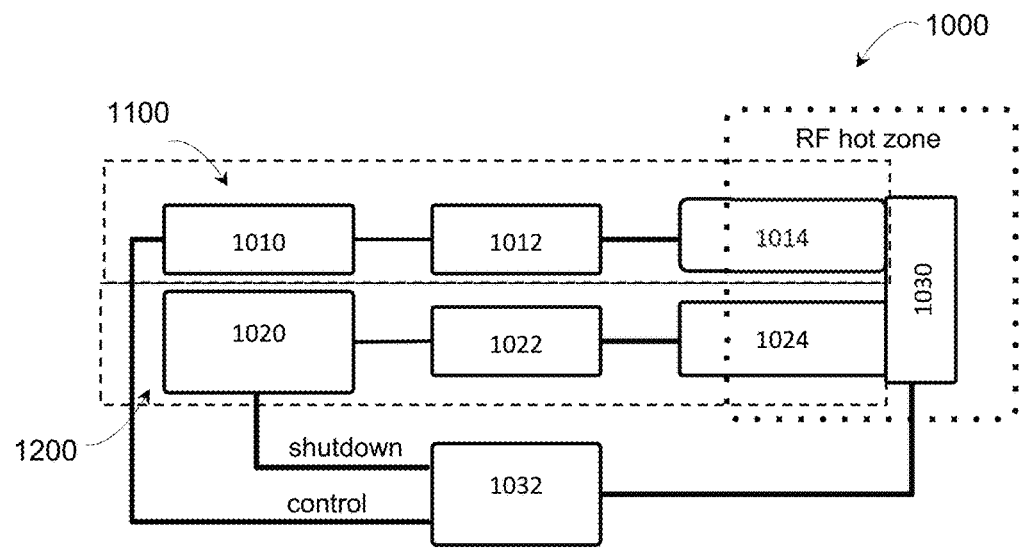
FIG. 3 is a schematic view of another example of a fiber optic temperature control system with two independent fiber optic temperature measuring systems.

FIG. 3 schematically illustrates another embodiment of a temperature control system 1000 with two separate measurement systems, such as a temperature control system 1100, and an overtemperature protection system 1200. The temperature control system 1100 comprises a first temperature controller 1010, a first optoelectronic converter 1012 and a first fiber optic probe 1014. The first optoelectronic convertor 1012 can comprise a first light source to provide illumination light to the first fiber optic probe 1014, a first detector to detect the emitted light and a first processing unit to process the emitted light and determines a temperature of the heater 1030. The fiber optic probe 1014 is configured to guide the illumination light to a measuring object, such as for example the heater 1030, and guide the light emitted from the heater 1030 back to the first detector. At the end of the fiber optic probe, there is the active sensing material, such as for example thermographic phosphor. It is well known that thermographic phosphors when excited with light within a certain wavelength range, emit a light within a different wavelength range with characteristics that change with temperature. The response of the emitted light to temperature is monitored by, for example, analyzing the change in emission intensity at a single wavelength range or the change in intensity ratio of two or more wavelength ranges, lifetime decay, or shift in an emission wavelength peak. Phosphor used for measuring the temperature of an object is either coated directly on the surface of the object or placed at a tip of the probe and brought in contact with the surface of the object, which is then illuminated with a light source and the temperature of the object is determined based on the response of the emitted light. Thus, that the temperature of the heater 1030 can be determined based of the emitted light received by the temperature controller 1010. The overtemperature protection system 1200 is separate and independent measuring system that also comprises a second overtemperature protection controller 1020, a second optoelectronic converter 1022 with a separate second light source, a second detector and a second processing unit; and a second fiber optic probe 1024. The temperature controller system 1000 further can comprise a heater controller 1032 that is in communication with the power source of the heater 1030 and the first temperature controller 1010 and the overtemperature protection controller 1020. In this embodiment, the fiber optic temperature control system 1000 has two independent temperature measuring systems with two independent probes 1014, 1024 and provide two independent temperature measurements. Each probe 1014, 1024 can have a separate sensor (e.g., thermographic phosphor) coupled to the distal end of the respective probe 1014, 1024. When the heater 1030 reaches the predetermined temperature the overtemperature protection system 1200 sends a signal to the heater controller 1032 to turn off the heater 1030. The temperature controller system 1100 independently measures the temperature of the heater 1030 and if the overtemperature protection system 1200 fails to turn off the heater at the predetermined temperature, it can send a signal to the heater controller 1032 to turn off the heater 1030.

Figure 4:
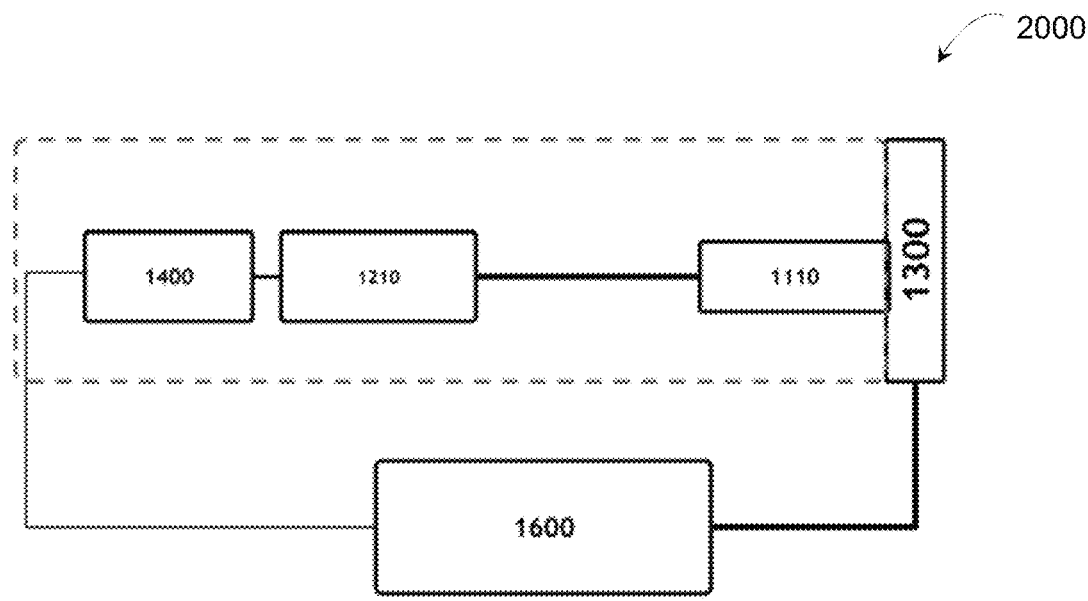
FIG. 4 is a schematic view of an example of an integrated active fiber optic temperature measuring and control system.

FIG. 4 schematically illustrates an embodiment of an integrated active temperature measurement and control system 2000 having a temperature measurement optoelectronic circuitry 1210 and a temperature control circuitry 1400 permanently integrated with a fiber optic probe 1110 to determine a temperature of a heater 1300. The integrated active fiber optic temperature measurement and temperature control system 2000 of the present invention integrates a fiber optic measuring probe 1110 with an active material on its tip and the optoelectronic circuit 1210 and the temperature control circuit 1400 into a single system 2000. Single system 2000 incorporates driving circuitry (light source with a driver), receiving circuitry, a processing unit, calibration data connected to a sensor and a control circuitry. The fiber optic temperature measuring and temperature control system 2000, that is illustrated in FIG. 4, integrates the fiber optic probe 1110 and the optoelectronic circuit 1210 and the temperature control circuitry 1400 in a single entity which is then possible to individually calibrate. This way each individual fiber optic temperature measuring and temperature control system 2000 undergo custom calibration as a part of production to achieve high measuring accuracy. For example, the fiber optic temperature measuring device of the present invention can achieve accuracy of about +/−0.05° C. and is ten times more accurate than the prior art fiber optic temperature measuring devices where the fiber optics and the electronics are interchangeable. The integrated temperature measurement and temperature control system 2000 further comprises a heater overtemperature control system 1600 to control heater temperature failure measurements.

Figure 6:
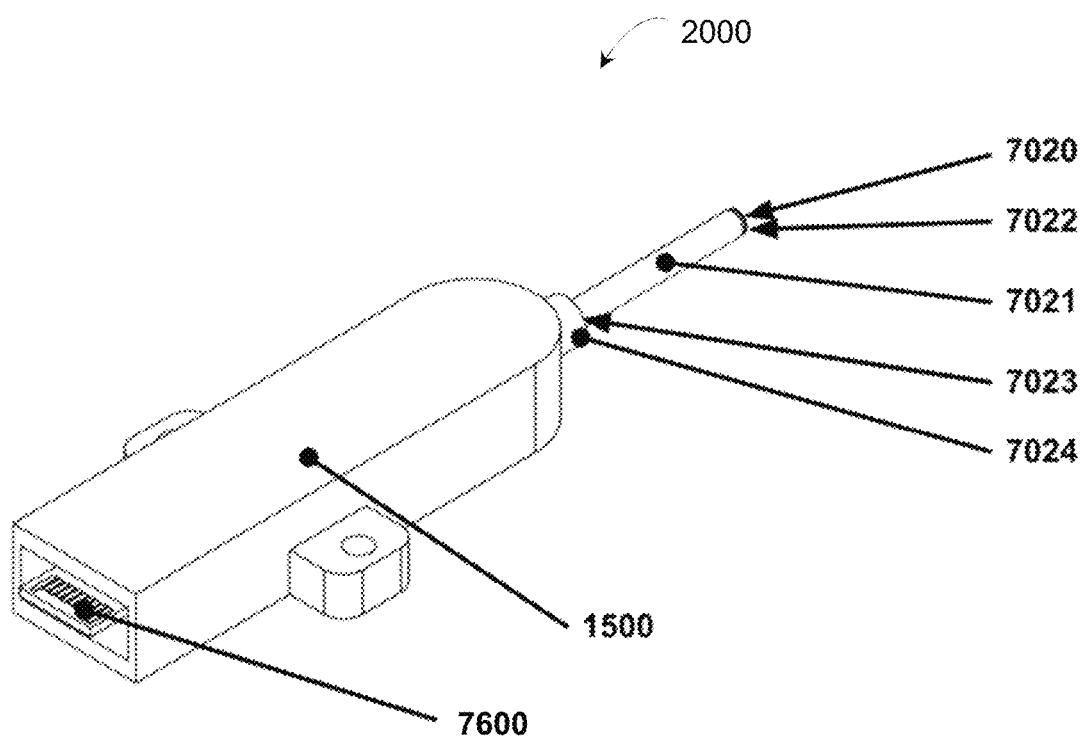
FIG. 6 is a perspective view of an example of an integrated active fiber optic temperature measuring and control system.

The integrated active temperature measurement and control system 2000 comprises a fiber bundle 7021 and a sensor with an active material 7020 (see FIG. 6). The fiber optic probe 1110 has a first end 7023 and a second end 7022. The sensor 7020 is functionally coupled to the second end 7022 of the fiber bundle 7021. The first end 7023 of the fiber optic probe 1110 is permanently connected through permanently integrated connector 7024 to a housing 1500 that houses the optoelectronic circuit 1210 and the temperature control circuitry 1400. In one implementation, the active material is a thermographic phosphor which when illuminated with an excitation light emits light in a wavelength different from the excitation light. For example, the excitation light can be UV light with a wavelength between 200-400 nm or light in the blue to green wavelength range (e.g. 400-600 nm). When the active material is illuminated with such excitation light it will emit fluorescence light in the red wavelength range of 600-800 nm. The response of the emitted light to temperature is monitored by various methods, such as analyzing the change in emission intensity at a single wavelength range or the change in intensity ratio of two or more wavelength ranges, lifetime decay, or shift in emission wavelength peak.

The fiber bundle 7021 is configured to transmit the excitation light and the emitted light. In one embodiment, the fiber bundle can comprise an excitation light guide (not shown) for transmitting the excitation light to the active material and an emitted light guide (not shown) for transmitting light emitted from the active material.

The first end 7023 of the fiber optic probe 1110 is permanently connected to the optoelectronic circuit 1210 and the temperature control circuit 1400. The housing 1500 encloses the optoelectronic circuit 1210 and the temperature control circuit 1400. The housing 1500 can be made from an aluminum or any other suitable material with RF shielding properties and can have an inner cavity that houses the optoelectronic circuit 1210 and the temperature control circuit 1400, and the permanently integrated connector 7024 through which the first end 7023 of the fiber bundle 7021 is connected to the housing that houses the optoelectronic circuit 1210 and the temperature control circuit 1400. By permanently connecting the fiber optic probe 1110 to the optoelectronic and temperature control housing 1500 an integrated active design of the temperature measurement and control system 2000 is provided. The housing 1500 further includes a port 7600 to connect the integrated active temperature measurement and control system 2000 to external power and processing systems.

The optoelectronic circuit 1210 as described herein before comprises the light source that is operatively coupled to the first end 7023 of the fiber bundle 7021 to provide the excitation light to the active material in the sensor 7020. A driver (not shown) is also provided to trigger the light source. The light source can be a laser or a LED that is configured to provide excitation light in the UV waveband between 200-400 nm, or in the blue to green wavelength range (e.g. 400-600 nm). The driver can be any suitable switching device that switches the light source on and off. The optoelectronic 1210 further comprises the detector configured to receive the light emitted from the active material.

The optoelectronic 1210 further comprises the processing unit that is operatively coupled to the driver of the light source and the detector, so that it can control the triggering time of the light source and/or its intensity/wavelength and process detected emitted light detected from the detector. The processing unit processes the digital signal obtained from the A/D converter in order to determine a change in an emission intensity at a single wavelength range or the change in intensity ratio of two or more wavelength ranges, a lifetime decay, or a shift in emission wavelength peak each of which is a function of the temperature measured. For example, the detector can have multiple regions tuned for sensitivity of different wavelengths that allow measurement of emission intensity at different wavelengths. A predetermined lookup table with the emission intensity at a single wavelength range or the change in intensity ratio of two or more wavelength ranges, a lifetime decay, or a shift in emission wavelength peak and measured parameter values is pre-programed into the processing unit. Therefore, the processing unit processes the digital signal and calculates a change in an emission intensity at a single wavelength range or the change in intensity ratio of two or more wavelength ranges, a lifetime decay, or a shift in emission wavelength peak of the light emitted from the active material, and using the lookup table, the processing unit determines the measured temperature value based on such calculated value.

The optoelectronic circuit 1210 and control circuit 1400 further comprises a power supply (not shown) to power the system 2000. In one implementation, the power supply can be a loop power supply with a transmitter. For example, the power supply can be a 4-20 mA current loop.

The optoelectronic circuit 1210 further comprises a calibration means coupled to the processing unit to calibrate each individual system 2000 so that the fiber probe 1110 is matched to the optoelectronic circuit 1210. For example, the calibration means are incorporated into the processing unit. Each of the integrated systems 2000 undergo custom calibration as a part of the production. The integrated system is calibrated using standard drywell or bath calibration methods utilized in conventional temperature sensor calibrations. Response signal for each individual sensor 7020 with a pre-determined known active material of the fiber optic probe 1110 (e.g., emission intensity at a single wavelength range or the change in intensity ratio of two or more wavelength ranges, a lifetime decay, or a shift in emission wavelength peak) is recorded in predetermined setpoints (in 10° C. increments) in the desired temperature range, for example from 50° C. to 450° C. The sensor 7020 is tested with a traceable reference thermometer that is inserted in a dry block calibrator. Temperature is stabilized at each setpoint and the response signal (e.g. decay time) and reference thermometer (for example traceable SPRT—secondary platinum record thermometer) readings are recorded. A custom lookup table correlating the response signal (e.g., decay time) and temperature readings is generated based on the results and uploaded to a non-volatile memory of the processing unit, including an identification for traceability purposes. The temperature readings are reported with linear (or other) interpolation in between the calibration points during measurements. A verification of calibration is performed by repeating this process and reporting any temperature deviation of the device under test from the reference thermometer. Reference setup uncertainty is established prior to the calibration and recorded on the calibration report.

Calibration of each individual integrated fiber optic temperature measuring and control system 2000 allows for minimization of all previously mentioned inaccuracies of the prior art devices to 0.05° C. The calibration curve specific to a given integrated fiber probe sensor (active material)/optoelectronic pair is enabling high accuracy and allowing for calibration to be performed on each individual sensor.

Figure 5:
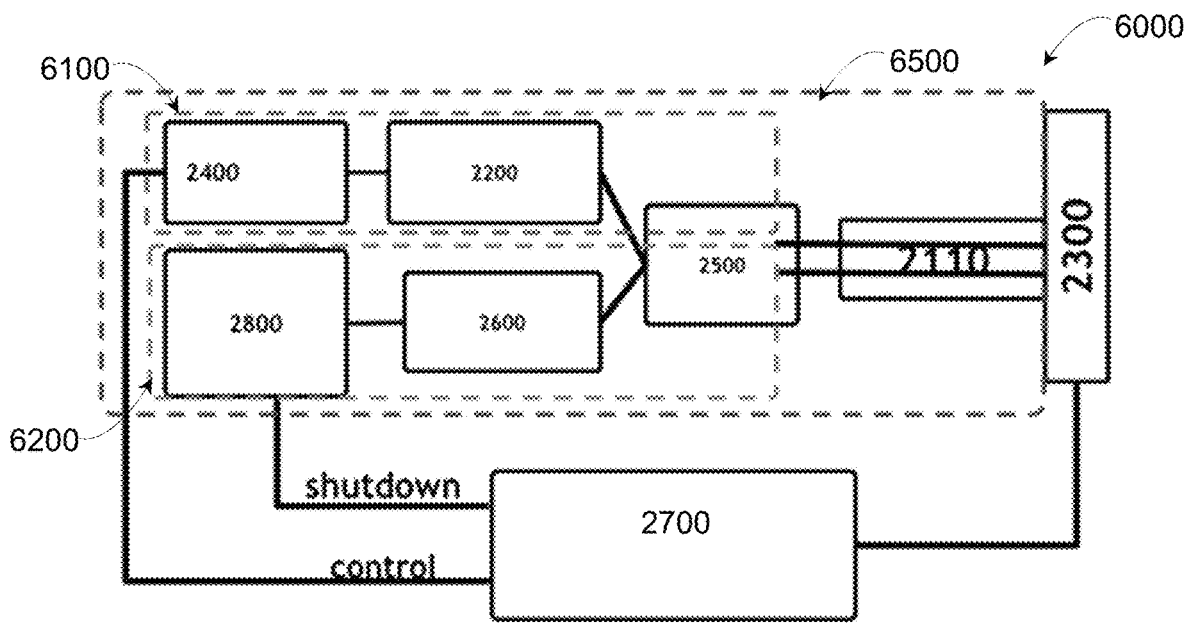
FIG. 5 is a schematic view of an integrated active fiber optic temperature measuring and control system with an overtemperature measuring protection system integrated into a single compact assembly.

FIG. 5 schematically illustrates another embodiment of an integrated active temperature measurement and control system 6000 that comprises at least one temperature measurement and control system 6100 and at least one overtemperature measuring protection system 6200 integrated with a fiber optic probe 2110 into a single active integrated system. The least one temperature measuring and control system 6100 comprises a first temperature controller 2400 and a first optoelectronic converter 2200. The first optoelectronic converter 2200 includes a first light source, a first detector and a first processing unit. The at least one temperature measurement system 6100 and the and at least one overtemperature measuring protection system 6200 is operatively coupled and integrated in a single housing 6500 with the fiber optic probe 2110. The first light source can provide excitation light to a sensor that comprises an active sensing material operatively coupled to a heater 2300. For example, the light source can be a laser or a LED that can provide an excitation light in the UV waveband range between 200-400 nm or in the blue to green wavelength range (e.g., 400-600 nm). The sensor can be a thermographic phosphor. When the thermographic phosphor is illuminated with the excitation light it will emit fluorescence light in the red wavelength range of 600-800 nm. The first detector is configured to receive the light emitted from the sensing active material. The processing unit is configured to process the signals detected from the detector and determines the measured temperature. The first optoelectronic converter 2200 converts the analog signal into a digital electrical signal and feeds a temperature signal to the first temperature controller 2400 that controls temperature of a heater 2300 by sending a control signal to a heater controller 2700.

The at least one overtemperature measuring protection system 6200 comprises a second temperature controller 2800 and a second optoelectronic convertor 2600 (similar to the optoelectronic convertor 2200). The second temperature controller 2800 is an overtemperature protection controller that is in communication with the heater controller 2700 and sends a shutdown signal to the heater controller 2700 when the temperature of the heater 2300 reaches a predetermined level. The second optoelectronic convertor 2600 comprises a second detector and a second processing unit. The second temperature controller 2800 can be passive controller and may not comprise any light source to provide excitation light to the sensing material. The second detector can also be a photodiode similar to the first detector. A splitter 2500 is coupled to the fiber optic probe 2110 to physically separate the first and the second fiber optic bundles into separate guiding channels in the fiber optic probe (see FIG. 2).

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An integrated active fiber optic temperature measuring and control system comprising:
   a fiber optic probe with a fiber bundle having a first end and a second end, and a sensor with an active material, the sensor being functionally coupled to the second end so that when the active material is illuminated with an excitation light it emits light in a wavelength different from an excitation light, the fiber bundle configured to transmit the excitation light and the emitted light;
   a housing to house a temperature measuring circuitry and a temperature control circuitry permanently integrated with the fiber optic probe; and
   a connector permanently connecting the fiber optic probe and the housing;
   wherein the temperature measuring circuitry comprises an optoelectronic circuitry including a light source aligned with the fiber bundle and configured to provide the excitation light to the active material that is operatively coupled to a heater; a driver operatively coupled to the light source to trigger the light source; a detector aligned with the fiber bundle to detect the emitted light; a processing unit operatively coupled to the driver of the light source and the detector, the processing unit determining a temperature of the heater based on a change in an emission intensity at a single wavelength range or a change in an intensity ratio of two or more wavelength ranges, a lifetime decay, or a shift in emission wavelength peak of the emitted light; and a calibration means coupled to the processing unit and configured to calibrate the integrated active fiber optic temperature measuring and control system by compensating for any differences in photonic behaviors of the active material and variability in optical coupling losses in the optoelectronic circuitry to correct for a relationship of a thermal input and an electrical output of the system,
   wherein the integrated active fiber optic temperature measuring and control system is individually calibrated by the calibration means to achieve higher accuracy, and wherein the temperature control circuitry comprises a temperature controller circuitry coupled to the optoelectronic circuitry such that the temperature controller circuitry controls the temperature of the heater and triggers a control signal to shutdown a power source of the heater when an overtemperature measuring protection system detects an overheating of the heater and/or a failure of the integrated active fiber optic temperature measuring and control system.

2. The integrated active fiber optic temperature measuring and control system of claim 1, wherein the failure of the integrated active fiber optic temperature measuring and control system is one of a high failure mode or a low failure mode.

3. The integrated active fiber optic temperature measuring and control system of claim 1, wherein the sensor is a thermographic phosphor bounded together using a binding material to secure the phosphor at the second end of the fiber optic probe.

4. The integrated active fiber optic temperature measuring and control system of claim 3, wherein the sensor is a monolithic thermographic phosphor.

5. An integrated active fiber optic temperature measuring and control system comprising:
   a fiber optic probe with a fiber bundle having a first end and a second end, and a sensor with an active material, the sensor being functionally coupled to the second so that when the active material is illuminated with an excitation light it emits light in a wavelength different from an excitation light, the fiber bundle configured to transmit the excitation light and the emitted light; and
   a housing to house at least one temperature measuring and control system and at least one overtemperature measuring protection system integrated with the fiber optic probe into a single active integrated system,
   wherein the at least one temperature measuring and control system comprises:
      a first temperature controller; and
      a first optoelectronic circuitry including a first light source aligned with the fiber bundle and configured to provide the excitation light to the active material, a first driver operatively coupled to the first light source to trigger the first light source, a first detector aligned with the fiber bundle to detect the emitted light and convert the detected emitted light into an analog signal, a first processing unit operatively coupled to the first driver of the first light source and the first detector to determine a temperature of a heater that is operatively coupled to the active material during temperature measurement of the heater, and a first calibration means coupled to the first processing unit and configured to calibrate the integrated active fiber optic temperature measuring and control system such that the integrated active fiber optic temperature measuring and control system is individually calibrated to achieve higher accuracy, wherein the first optoelectronic circuitry converts the analog signal obtained from the first detector into a digital electrical signal and feeds the digital electrical signal to the first temperature controller, which controls a temperature of the heater by sending a control signal to a heater controller;

and wherein the at least one overtemperature measuring protection system comprises:
a second temperature controller; and
a second optoelectronic circuitry coupled to the second controller, the second optoelectronic circuitry including a second detector and a second processing unit;
wherein the heater controller is in communication with a driver of the heater, and the first temperature controller and the second temperature controller;
wherein the heater controller receives a control signal from the first temperature controller to stabilize the heater temperature at a predetermined range; and wherein the heater controller receives a shutdown signal from the at least one overtemperature measuring protection system when it detects a failure of the at least one temperature measuring and control system and/or when the heater temperature is above the predetermined range to turn off the heater.

6. The integrated active fiber optic temperature measuring and control system of claim 5, wherein the overtemperature measuring protection system is passive without any light sources.

7. The integrated active fiber optic temperature measuring and control system of claim 5, wherein the overtemperature measuring protection system further comprises a second light source.

8. The integrated active fiber optic temperature measuring and control system of claim 5, further comprising a splitter coupled to a first and a second fiber optic bundle to physically separate the first and the second fiber optic bundles into a first and a second independent optical guiding channel.

9. The integrated active fiber optic temperature measuring and control system of claim 8, wherein the fiber optic probe is a single fiber optic probe, and wherein the first end of the fiber optic probe is coupled to the splitter, an elongated body of the fiber optic probe enclosing the first and the second independent optical guiding channels.

10. The integrated active fiber optic temperature measuring and control system of claim 8, wherein the first light source provides excitation light to the sensor through the first optical guiding channel, and the light emitted from the sensor is transmitted to the first detector through the first optical guiding channel and to the second detector through the second optical guiding channel.

* * * * *